(12) United States Patent
Austin et al.

(10) Patent No.: US 12,271,627 B2
(45) Date of Patent: Apr. 8, 2025

(54) OFF-CHIP MEMORY SHARED BY MULTIPLE PROCESSING NODES

(71) Applicants: Advanced Micro Devices, Inc., Santa Clara, CA (US); ATI Technologies ULC, Markham (CA)

(72) Inventors: Michael John Austin, Austin, TX (US); Dmitri Tikhostoup, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/937,292

(22) Filed: Sep. 30, 2022

(65) Prior Publication Data
US 2024/0111452 A1 Apr. 4, 2024

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 3/0653; G06F 3/0679; G06F 3/068; G06F 3/061
See application file for complete search history.

(56) References Cited

U.S. PATENT DOCUMENTS

| | | | |
|---|---|---|---|
| 5,703,813 | A | 12/1997 | Manning |
| 5,828,856 | A | 10/1998 | Bowes |
| 5,998,829 | A | 12/1999 | Choi |

(Continued)

OTHER PUBLICATIONS

Infineon Technologies North America Corporation and Kingston Technology Company, Inc. "Intel Dual-Channel DOR Memory Architecture White Paper" [Online] Sep. 2003, XP002505798; http://www.kingston.com/newtech/ DMKF520DDRWhitepaper.pdf pp. 1-14.

(Continued)

*Primary Examiner* — Khoa D Doan
*Assistant Examiner* — Tong B. Vo
(74) *Attorney, Agent, or Firm* — Kowert, Hood, Munyon, Rankin & Goetzel, P.C.; Rory D. Rankin

(57) ABSTRACT

An apparatus and method for efficiently managing performance among multiple integrated circuits in separate semiconductor chips. In various implementations, a computing system includes at least a first processing node and a second processing node. While processing tasks, the first processing node accesses a first memory and the second processing node accesses a second memory. A first communication channel transfers data between the first and second processing nodes. The first processing node accesses the second memory using a second communication channel different from the first communication channel and supports point-to-point communication. The second memory services access requests from the first and second processing nodes as the access requests are received while foregoing access conflict detection. The first processing node accesses the second memory after a particular amount of time has elapsed after reception of an indication from the second processing node specifying that a particular task has begun.

20 Claims, 5 Drawing Sheets

(56) References Cited

U.S. PATENT DOCUMENTS

| | | | |
|---|---|---|---|
| 6,026,466 A | 2/2000 | Su | |
| 6,055,615 A | 4/2000 | Okajima | |
| 6,108,745 A | 8/2000 | Gupta | |
| 6,445,638 B1 | 9/2002 | Hsu | |
| 6,452,834 B1 | 9/2002 | Kengeri | |
| 6,545,935 B1 | 4/2003 | Hsu | |
| 6,816,889 B1 | 11/2004 | Graham | |
| 6,999,091 B2 | 2/2006 | Saxena | |
| 7,091,543 B2 | 8/2006 | Tzeng | |
| 7,110,306 B2 | 9/2006 | Parris | |
| 7,174,430 B1* | 2/2007 | O'Krafka | G06F 12/0813 711/146 |
| 8,006,032 B2 | 8/2011 | Askar et al. | |
| 2005/0033909 A1 | 2/2005 | Chang | |
| 2005/0289317 A1 | 12/2005 | Liou | |
| 2006/0294264 A1 | 12/2006 | Akiyama | |
| 2017/0277600 A1* | 9/2017 | Kamimoto | G06F 11/2094 |
| 2020/0074583 A1* | 3/2020 | Holland | G06F 12/1081 |
| 2021/0141545 A1* | 5/2021 | Kang | G06F 3/0677 |
| 2022/0012189 A1* | 1/2022 | Das Sharma | G06F 13/385 |
| 2023/0297159 A1* | 9/2023 | Daxer | G06F 1/3296 713/324 |
| 2023/0334613 A1* | 10/2023 | Daxer | G06T 1/60 |
| 2023/0409198 A1* | 12/2023 | Zhou | G06F 3/067 |
| 2024/0078041 A1* | 3/2024 | Lu | G11C 8/12 |

OTHER PUBLICATIONS

Translation of Official Communication in German application No. 11 2008 002 273.9 issued on Oct. 13, 2010 pp. 1-2.

* cited by examiner

OFF-CHIP MEMORY SHARED BY MULTIPLE PROCESSING NODES

BACKGROUND

Description of the Relevant Art

A variety of computing devices utilize heterogeneous integration, which integrates multiple types of semiconductor dies for providing system functionality. A variety of choices exist for system packaging to integrate the multiple types of semiconductor dies. In some computing devices, a system-on-a-chip (SOC) is used, whereas, in other computing devices, smaller and higher-yielding chips are packaged as large chips in multi-chip modules (MCMs). Different semiconductor chips, each with their own semiconductor chip package that includes one or more semiconductor dies, are placed on a motherboard of a computing device. Examples of the computing device are a desktop computer, a server computer, a laptop computer, and so on.

The semiconductor chips communicate with one another with transmission of electrical signals through metal traces on the motherboard. Some of these semiconductor chips on the motherboard include memory devices. While processing tasks of a workload, a semiconductor chip uses one or more memory devices to store user data, intermediate result data, final result data, instructions of an application to execute, and so on. In some cases, a semiconductor chip that includes one or more memory devices is accessed by another, single semiconductor chip. Although multiple semiconductor dies (or dies) within the other semiconductor chip access the one or more memory devices, the multiple dies use the same communication channel. Therefore, the multiple dies share the capacity of the one or more memory devices, and access is determined by arbitration within the semiconductor chip. Accordingly, the performance of a particular die of the multiple dies is dependent upon a size of a portion of the total memory capacity of the one or more memory devices made available to the particular die.

The performance of the particular die of the multiple dies is also dependent upon the arbitration techniques within the semiconductor chip and the number of dies within the semiconductor chip capable of accessing the one or more memory devices. In other cases, a semiconductor chip that includes one or more memory devices is accessed by two or more other semiconductor chips. To control access among the multiple dies of the two or more other semiconductor chips, arbitration circuitry is included in the semiconductor chip that includes one or more memory devices. Alternatively, the arbitration circuitry is included in another semiconductor chip used as a communication hop prior to memory access requests arriving at the semiconductor chip that includes one or more memory devices. With either technique, system cost increases to support the arbitration circuitry.

In view of the above, efficient methods and apparatuses for managing performance among multiple integrated circuits in separate semiconductor chips are desired.

Figure 1:
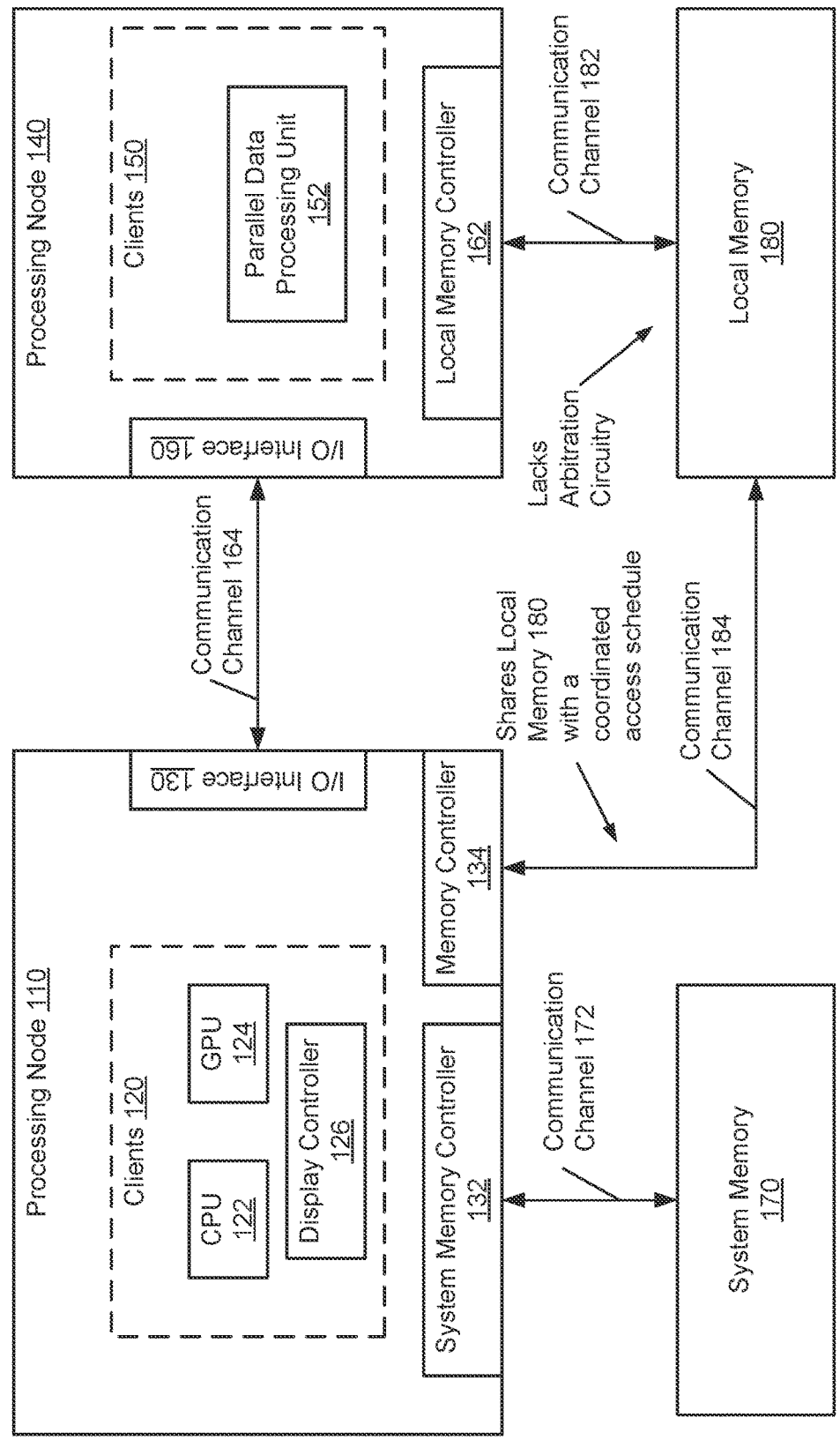
FIG. 1 is a generalized block diagram of a computing system that manages performance among multiple integrated circuits in separate semiconductor chips.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently managing performance among multiple integrated circuits in separate semiconductor chips are contemplated. In various implementations, a computing system includes at least a first processing node and a second processing node. The hardware, such as circuitry, of each of the first processing node and the second processing node provides a variety of functionalities. For example, each of the first processing node and the second processing node includes multiple integrated circuits that perform the variety of functionalities. The first processing node accesses a first memory while processing tasks. In various implementations, the first memory is off-chip memory. In an implementation, the first processing node is a system on a chip (SoC) in a semiconductor package on a motherboard and the first memory is one of a variety of types of synchronous random-access memory (SRAM) in a separate semiconductor package on the motherboard.

The second processing node accesses a second memory while processing tasks. Similar to the first memory, in an implementation, the second memory is off-chip memory. In an implementation, the second processing node is a system on a chip (SoC) in a semiconductor package on the motherboard and the second memory is one of a variety of types of SRAM in a separate semiconductor package on the motherboard. A first communication channel transfers data between integrated circuits of the first processing node and the second processing node. In an implementation, the first communication channel supports a communication protocol such as the Peripheral Component Interconnect Express (PCIe) protocol. The first processing node accesses the second memory using a second communication channel different from the first communication channel and supports point-to-point communication. In an implementation, the second communication channel supports a communication protocol such as the Graphics Double Data Rate (GDDR) protocol.

In various implementations, the second memory services access requests from the first and second processing nodes as the access requests are received without checking for access conflicts. In such an implementation, the second memory does not include circuitry to check for access conflicts between accesses received from the first and second nodes. Therefore, the second memory is a memory shared by at least the first processing node and the second processing node, but the second memory lacks arbitration circuitry. Since the first processing node uses the second communication channel that supports point-to-point communication, there is no arbitration circuitry between the first processing node and the second memory. In order to handle access conflicts and memory coherency without dedicated circuitry for these tasks in the second memory, the first processing node and the second processing node coordinate via the first communication channel their accesses of the second memory. In an implementation, the first processing node waits for a period of time after the second processing node accesses the second memory before performing an access to the second memory.

In some implementations, the first processing node and the second processing node perform tasks of a video graphics processing workload. The second processing node performs rendering of a video frame and stores (writes) the rendered video frame in the second memory. The first processing node loads (reads) the rendered video frame from the second memory, but does not store the rendered video frame in the first memory. Rather, an integrated circuit of the first processing node, such as a display controller, directly receives and uses the rendered video frame without accessing the first memory. Prior to beginning the video graphics processing workload, the first processing node and the second processing node set up a coordinated access schedule of the second memory. This access schedule determines which pipeline stage or clock cycle each of the first processing node and the second processing node is permitted to access a particular address range of the second memory.

The first processing node and the second processing node utilize the first communication channel to set up this coordinated access schedule of the second memory. This coordinated access schedule of the second memory prevents access conflicts and maintains memory coherency without dedicated circuitry for these tasks in the second memory. Further details of the coordinated accesses of the second memory that manages performance among multiple integrated circuits in separate semiconductor chips is provided in the below description of FIGS. 1-5.

Referring to FIG. 1, a generalized block diagram is shown of a computing system 100 that manages performance among multiple integrated circuits in separate semiconductor chips. In the illustrated implementation, the computing system 100 includes the processing nodes 110 and 140, system memory 170, local memory 180, and communication channels 162, 172, 182 and 184. The hardware, such as circuitry, of each of the first processing node 110 and the second processing node 140 provides a variety of functionalities. For example, the first processing node 110 includes numerous semiconductor dies such as the clients 120 and the second processing node 140 includes the clients 150. As used herein, a "client" refers to an integrated circuit with data processing circuitry and internal memory, which has tasks assigned to it by a scheduler such as an operating system (OS) scheduler or other. Examples of tasks are software threads of a process of an application, which are scheduled by the OS scheduler.

Examples of clients are a general-purpose central processing unit (CPU), a parallel data processing unit with a relatively wide single-instruction-multiple-data (SIMD) microarchitecture, a multimedia integrated circuit, one of a variety of types of an application specific integrated circuit (ASIC), a digital signal processor (DSP), a field programmable gate array (FPGA), one or more microcontrollers, and so forth. For example, the clients 120 of the processing node 110 include at least the CPU 122, the integrated GPU 124 (or iGPU 124 or GPU 124), and the display controller 126. The clients 150 of the processing node 140 includes at least the parallel data processing unit 152. In an implementation, the parallel data processing unit 152 is a dedicated GPU (or dGPU) and the processing node 140 is a dedicated video graphics chip or chipset. Clock sources, such as phase lock loops (PLLs), an interrupt controller, a communication fabric, power controllers, memory controllers, interfaces for input/output (I/O) devices, and so forth are not shown in the computing system 100 for ease of illustration. It is also noted that the number of components of the computing system 100 and the number of subcomponents for those shown in FIG. 1, such as within the clients 120, can vary from implementation to implementation. There can be more or fewer of each component/subcomponent than the number shown for the computing system 100.

In an implementation, the processing node 110 is a system on a chip (SoC) in a semiconductor package on a motherboard and the system memory 170 is one of a variety of types of synchronous random-access memory (SRAM) in a separate semiconductor package on the motherboard. The processing node 110 accesses the system memory 170 while processing tasks of a workload. The processing node 110 uses the system memory controller 132 to transfer data with the system memory 170 via the communication channel 172. In various implementations, the communication channel 172 is a point-to-point communication channel. A point-to-point communication channel is a dedicated communication channel between a single source and a single destination. Therefore, the point-to-point communication channel transfers data only between the single source and the single destination. In an implementation, the system memory controller 132, the communication channel 172, and the system memory 170 support one of a variety of types of a Double Data Rate (DDR) communication protocol or one of a variety of types of a Low-Power Double Data Rate (LPDDR) communication protocol.

The processing node 140 accesses the local memory 180 while processing tasks of a workload. Similar to the system memory 170, in an implementation, the local memory 180 is off-chip memory. In an implementation, the processing node 140 is a system on a chip (SoC) in a semiconductor package on the motherboard and the local memory 180 is one of a variety of types of SRAM in a separate semiconductor package on the motherboard. The processing node 140 uses the local memory controller 162 to transfer data with the local memory 180 via the communication channel 182. In an implementation, the local memory controller 162 supports one of a variety of types of a Graphics Double Data Rate (GDDR) communication protocol.

The communication channel 164 transfers data between integrated circuits of the processing node 110 and the processing node 140. The processing node 110 includes the input/output (I/O) interface 130 to support data transmission on the communication channel 164. Similarly, the processing node 140 includes the I/O interface 160 to support data transmission on the communication channel 164. Therefore, the processing node 110 is able to communicate and transfer data with another processing node, such as the processing node 140, which is external to the processing node 110. Therefore, relative to the processing node 110, the processing node 140 is an external processing node. Similar to other interfaces, such as the system memory controller 132, the memory controller 134, and the local memory controller 162, the I/O interfaces 130 and 160 include one or more queues for storing requests, responses, and messages, and include circuitry that builds packets for transmission and that disassembles packets upon reception. One or more of these components 130, 132, 134, 160 and 182 also include power management circuitry, and circuitry that supports a particular communication protocol. In an implementation, the I/O interfaces 130 and 160 support a communication protocol such as the Peripheral Component Interconnect Express (PCIe) protocol.

In various implementations, the local memory 180 has higher data rates, higher data bandwidth, and higher power consumption than the system memory 170. As described earlier, in an implementation, the local memory controller 162 of the processing node 140 supports a communication protocol such as one of a variety of versions of the Graphics Double Data Rate (GDDR) protocol. The local memory 180 is also accessed by the processing node 110 via the memory controller 134. Therefore, the processing node 110 accesses external memory of an external processing node such as the local memory 180 of the processing node 140. To do so, the processing node 110 uses the memory controller 134 connected to the communication channel 184. In such implementations, each of the processing node 110 and the processing node 140 includes a memory controller (memory controller 134 for the processing node 110, memory controller 162 for the processing node 140) supporting the communication protocol of the local memory 180 such as the GDDR protocol or other.

In various implementations, each of the communication channels 182 and 184 is a point-to-point (P2P) communication channel. As described earlier, a point-to-point communication channel is a dedicated communication channel between a single source and a single destination. Therefore, the point-to-point communication channel transfers data only between the single source and the single destination. The address information, command information, response data, payload data, header information, and other types of information are transferred on metal traces or wires that are accessible by only the single source and the single destination. It is noted that although the communication channels 172, 182 and 184 use the term "communication channel," each of the communication channels 172, 182 and 184 is capable of transferring data across multiple memory channels supported by a corresponding memory device. For example, a single memory channel of a particular memory device can include 60 or more individual signals with 32 of the signals dedicated for the response data or payload data. A memory controller or interface of the memory device can support multiple memory channels. Each of these memory channels is included within any of the communication channels 172, 182 and 184.

Rather than have all of the multiple communication channels of the local memory 180 between the processing node 140 and the local memory 180, one or more of these multiple communication channels is between the processing node 110 and the local memory 180 such as at least the communication channel 184. When the processing node 110 and the processing node 140 execute a workload together, the processing node 110 and the processing node 140 initially set up a coordinated access schedule of the local memory 180. This coordinated access schedule determines which pipeline stage or clock cycle each of the processing node 110 and the processing node 140 is permitted to access a particular address range of the local memory 180. The processing node 110 and the processing node 140 utilize the communication channel 164 to set up this coordinated access schedule of the local memory 180. This coordinated access schedule of the local memory 180 prevents access conflicts and maintains memory coherency without dedicated arbitration circuitry for these tasks in the local memory 180. After the coordinated access schedule of the local memory 180 is completed, it is unnecessary for the processing node 110 to communicate with the processing node 140 via the communication channel 164 in order to access data stored in the local memory 180.

In various implementations, the interface(s) of the local memory 180 are modified or initially designed to support at least two point-to-point communication channels. For example, typical GDDR interfaces support a single point-to-point communication channel that includes one or more memory channels. However, the local memory 180 is capable of supporting at least two point-to-point communication channels, each with one or more memory channels. In one example, rather than support a single point-to-point communication channel with 4 memory channels between the processing node 140 and the local memory 180, the local memory 180 supports two point-to-point communication channels such as the communication channels 182 and 184, each with two memory channels. The memory bandwidth between the processing node 140 and the local memory 180 reduces, but overall system performance increases.

In some implementations, any of the clients 120 of the processing node 110 uses data retrieved from the local memory 180 via the communication channel 184 while foregoing storing the data in the system memory 170. In addition, when the processing nodes 110 and 140 communicate ahead of time regarding when to access the same data storage areas of the local memory 180, such as during particular clock cycles or during particular pipeline stages, it is unnecessary for the local memory 180 to include arbitration circuitry or other circuitry to detect access conflicts or maintain memory coherency.

In an implementation, the parallel data processing unit 152 processes, or renders, video frame data stored in the local memory 180, and stores the resulting processed video data in the local memory 180. One of the CPU 122, the GPU 124, or another client of the clients 120 of the processing node 110 retrieves the rendered video frame data from the local memory 180 through the memory controller 134 and the communication channel 184. This client of the clients 120 sends this retrieved data directly to the display controller 126 while foregoing storing the retrieved data in the system memory 170. In another implementation, the display controller 126 directly retrieves the rendered video frame data through the memory controller 134 and the communication channel 184.

Figure 2:
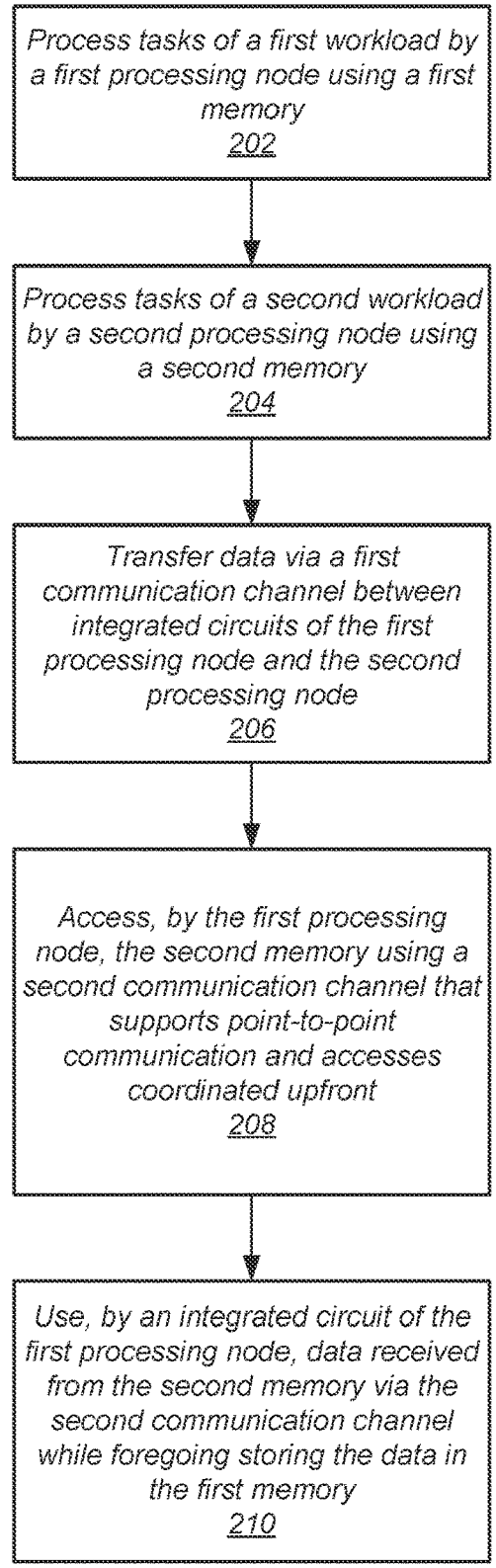
FIG. 2 is a generalized block diagram of a method for managing performance among multiple integrated circuits in separate semiconductor chips.

Referring to FIG. 2, a generalized block diagram is shown of a method 200 for efficiently managing performance among multiple integrated circuits in separate semiconductor chips. For purposes of discussion, the steps in this implementation (as well as in FIGS. 3-4) are shown in sequential order. However, in other implementations some steps occur in a different order than shown, some steps are performed concurrently, some steps are combined with other steps, and some steps are absent.

In various implementations, a computing system includes at least a first processing node and a second processing node. The hardware, such as circuitry, of each of the first processing node and the second processing node provides a variety of functionalities. For example, each of the first processing node and the second processing node includes numerous semiconductor dies that perform the functionality of an input/output interface controller, an interrupt controller, a communication fabric, and so on. Each of the first processing node and the second processing node also includes multiple clients, each with data processing circuitry and local memory for processing software threads assigned by an operating system scheduler. Examples of clients are a general-purpose central processing unit (CPU), a parallel data processing unit with a relatively wide single-instruction-multiple-data (SIMD) microarchitecture, a multimedia integrated circuit, one of a variety of types of an application specific integrated circuit (ASIC), a digital signal processor (DSP), a field programmable gate array (FPGA), one or more microcontrollers, and so forth. The first processing node accesses a first memory while processing tasks of a first workload (block 202). The second processing node uses a second memory while processing tasks of a second workload (block 204). In an implementation, the first processing node is an accelerated processing unit (APU) with at least a CPU and an integrated parallel data processing unit such as a GPU. Such a GPU is also referred to as an "iGPU." In various implementations, the first memory is off-chip memory, and the first memory is one of a variety of types of synchronous random-access memory (SRAM) in a separate semiconductor package on the motherboard.

Similar to the first memory, in an implementation, the second memory is off-chip memory. In an implementation, the second processing node is a system on a chip (SoC) in a semiconductor package on the motherboard and the second memory is one of a variety of types of SRAM in a separate semiconductor package on the motherboard. The second processing node is a dedicated video graphics chip or chipset with a dedicated parallel data processing unit such as a dedicated GPU. Such a GPU is also referred to as an "dGPU." The second memory is one of a variety of types of synchronous dynamic random-access memory (SDRAM) specifically designed for applications requiring both high memory data bandwidth and high memory data rates.

A first communication channel transfers data between integrated circuits of the first processing node and the second processing node (block 206). In an implementation, the first communication channel supports a communication protocol such as the Peripheral Component Interconnect Express (PCIe) protocol. When the first processing node and the second processing node execute a workload together, the first processing node and the second processing node initially set up a coordinated access schedule of the second memory. This coordinated access schedule determines which pipeline stage or clock cycle each of the first processing node and the second processing node is permitted to access a particular address range of the second memory. The first processing node and the second processing node utilize the first communication channel to set up this coordinated access schedule of the second memory. This coordinated access schedule of the second memory prevents access conflicts and maintains memory coherency without dedicated arbitration circuitry for these tasks in the second memory. After the coordinated access schedule of the second memory is completed, it is unnecessary for the first processing node to communicate with the second processing node via the first communication channel in order to access data stored in the second memory.

The first processing node accesses the second memory using a second communication channel that supports point-to-point communication (block 208). The second communication channel is a memory access communication channel supported by the circuitry of the second memory. In an implementation, the second communication channel supports a communication protocol such as a version of the Graphics Double Data Rate (GDDR) protocol. In such implementations, each of the first processing node and the second processing node include a memory controller supporting the communication protocol of the second memory.

An integrated circuit of the first processing node uses data received from the second memory via the second communication channel while foregoing storing the data in the first memory (block 210). Therefore, it is unnecessary for the integrated circuit of the first processing node to store, in the first memory, the retrieved data from the second memory. Additionally, any integrated circuit of the first processing node is able to use the data received from the second memory via the second communication channel while foregoing storing the data in the first memory. In some implementations, the first processing node and the second processing node perform tasks of a video graphics processing workload. The second processing node performs rendering of a video frame and stores (writes) the rendered video frame in the second memory. The first processing node loads (reads) the rendered video frame from the second memory, but does not store the rendered video frame in the first memory. Rather, an integrated circuit of the first processing node, such as a display controller, directly receives and uses the rendered video frame without accessing the first memory.

Figure 3:
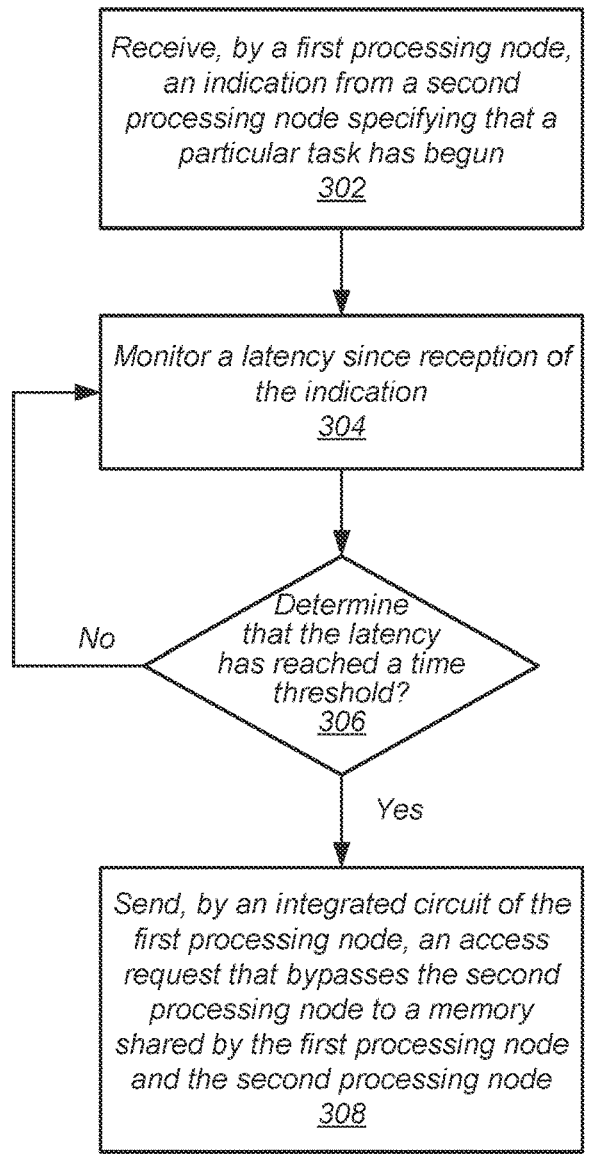
FIG. 3 is a generalized block diagram of a method for managing performance among multiple integrated circuits in separate semiconductor chips.

Turning now to FIG. 3, a generalized block diagram is shown of a method 300 for efficiently managing performance among multiple integrated circuits in separate semiconductor chips. In various implementations, a computing system includes at least a first processing node and a second processing node with each being a SoC in a respective semiconductor chip package on a motherboard. The first processing node accesses a first memory, which is off-chip memory used as system memory by the multiple integrated circuits of the first processing node. The second processing node accesses a second memory, which is off-chip memory used as local memory by the multiple integrated circuits of the second processing node. The first processing node receives an indication from the second processing node specifying that a particular task has begun (block 302). The first processing node monitors an amount of time elapsed since reception of the indication (block 304).

If the first processing node determines that a given amount of time has not yet reached a time threshold ("no" branch of the conditional block 306), then control flow of method 300 returns to block 304 where the first processing node continues to monitor the amount of time since reception of the indication. If the first processing node determines that the amount of time has reached the time threshold ("yes" branch of the conditional block 306), then an integrated circuit of the first processing node sends an access request that bypasses the second processing node to a memory shared by the first processing node and the second processing node (block 308). For example, this shared memory is the second memory. Using an elapsed period of time amount of time between accesses, which is part of a coordinated access schedule of the second memory set up by the first processing node and the second processing node, access conflicts of the second memory are avoided. Therefore, the second memory does not need arbitration circuitry or memory coherency circuitry to distinguish accesses between the first processing node and the second processing node.

Figure 4:
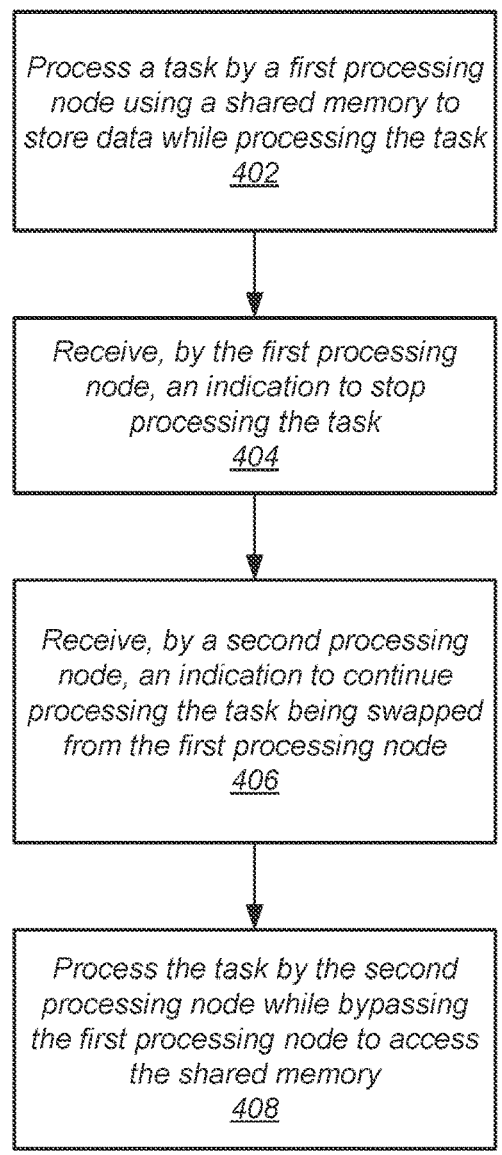
FIG. 4 is a generalized block diagram of a method for managing performance among multiple integrated circuits in separate semiconductor chips.

Turning now to FIG. 4, a generalized block diagram is shown of a method 400 for efficiently managing performance among multiple integrated circuits in separate semiconductor chips. In various implementations, a computing system includes at least a first processing node and a second processing node. The hardware, such as circuitry, of each of the first processing node and the second processing node provides a variety of functionalities. For example, each of the first processing node and the second processing node includes numerous semiconductor dies that provide the functionality of a variety of types of clients, interface controllers, and so on. The first processing node processes a task using a shared memory to store data while processing the task (block 402). The first processing node receives an indication to stop processing the task (block 404). The second processing node receives an indication to continue processing the task being swapped from the first processing node (block 406). The second processing node processes the task while bypassing the first processing node to access the shared memory (block 408).

Figure 5:
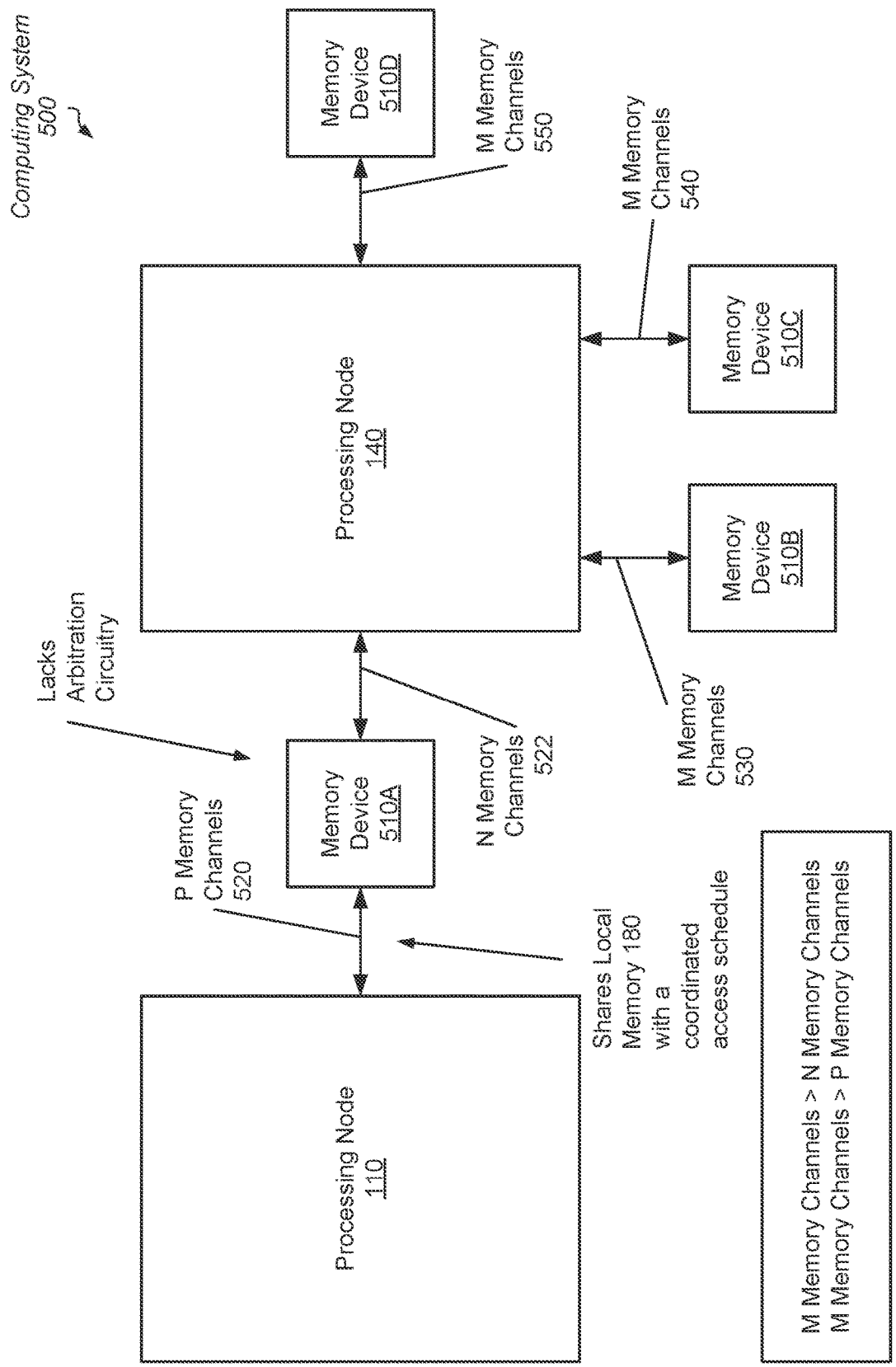
FIG. 5 is a generalized block diagram of a computing system that manages performance among multiple integrated circuits in separate semiconductor chips.

Referring to FIG. 5, a generalized block diagram is shown of a computing system 500 that manages performance among multiple integrated circuits in separate semiconductor chips. Circuits described earlier are numbered identically. In the illustrated implementation, the computing system 500 includes the processing nodes 110 and 140. The system memory 170 used by the processing node 110 and the internal components of the processing nodes 110 and 140 are not shown for ease of illustration. Here, the off-chip local memory of the processing node 140 is implemented using the memory devices 510A-510D. Although four memory devices are shown, in other implementations, any number of memory devices is possible, and the number of memory devices is based on design requirements.

In various implementations, each of the memory devices 510A-510D is a same type of semiconductor chip providing off-chip memory dies for data storage. In an implementation, each of the memory devices 510A-510D supports one of a variety of types of a GDDR protocol. As shown, the memory device 510B uses M memory channels 530 for data transfer with the processing node 140. Here, the value M is a positive, non-zero integer. Similarly, the memory device 510C uses M memory channels 540 for data transfer with the processing node 140, and the memory device 510D uses M memory channels 550 for data transfer with the processing node 140. In contrast, the memory device 510A uses N memory channels 522 for data transfer with the processing node 140. Here, the value N is a positive, non-zero integer that is less than the value M.

Rather than have all of the memory devices 510A-510D accessed by the processing node 140, at least one of the memory devices, such as memory device 510A, is shared with the processing node 110. For example, the memory device 510A uses P memory channels 520 for data transfer with the processing node 110. Here, the value P is a positive, non-zero integer that is less than the value M. However, the memory device 510A does not include arbitration circuitry. As described earlier, the processing node 110 and the processing node 140 set up a coordinated access schedule for the memory device 510A. This access schedule determines which pipeline stage or clock cycle each of the processing node 110 and the processing node 140 set is permitted to access a particular address range of the memory device 510A.

In various implementations, the interface(s) of the memory device 510A are modified or initially designed to support at least two point-to-point communication channels. For example, typical GDDR interfaces support a single point-to-point communication channel that includes one or more memory channels. However, the memory device 510A is capable of supporting at least two point-to-point communication channels, each with one or more memory channels. In some implementations, the sum of the values N and P is equal to the value of M. In an implementation, the value P is equal to the value of N, and therefore, each of the values P and N is one half of the value M. Compared to the data bandwidth of the M memory channels 530, 540 and 550, the data bandwidth is smaller for the P memory channels 520 and the N memory channels 522. However, while processing a workload together, it is unnecessary for the processing node 110 to communicate with the processing node 140 in order to access data stored in the memory device 510A. Additionally, any integrated circuit of the processing node 110 is able to use the data received from the memory device 510A via the P memory channels 520 while foregoing storing the retrieved data in a corresponding system memory such as system memory 170 (of FIG. 1).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random-access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
a first integrated circuit configured to access a first memory via a first communication channel, wherein a communication channel supports data transmission comprising at least requests and responses between a single source and a single destination; and
a second integrated circuit configured to access the first memory via a second communication channel, based at least in part on an indication received via a third communication channel that the first integrated circuit accessed the first memory.

2. The apparatus as recited in claim 1, wherein the second communication channel is a point-to-point communication channel, and the second integrated circuit is configured to access the first memory based at least in part on an elapse of a particular amount of time since the indication was received.

3. The apparatus as recited in claim 1, wherein the access of the first memory by the second integrated circuit targets a video frame, rendered by the first integrated circuit.

4. The apparatus as recited in claim 1, wherein the second integrated circuit is configured to send, via the second communication channel that is a point-to-point communication channel, an access request to a memory controller of the first memory.

5. The apparatus as recited in claim 2, wherein the first memory is local to the first integrated circuit and external to the second integrated circuit.

6. The apparatus as recited in claim 1, wherein the first integrated circuit and second integrated circuit are configured to share the first memory.

7. The apparatus as recited in claim 1, wherein:
the second communication channel is a point-to-point communication channel that supports a Graphics Double Data Rate communication protocol; and
the third communication channel supports a Peripheral Component Interconnect Express communication protocol.

8. A method, comprising:
accessing, by a first processing node, a first memory via a first communication channel, wherein a communication channel supports data transmission comprising at least requests and responses between a single source and a single destination;
receiving, by a second processing node via a second communication channel, an indication of a memory access of the first memory by the first processing node; and
accessing, by the second processing node, the first memory via a third communication channel, based at least in part on the indication, wherein the first memory is external to the second processing node.

9. The method as recited in claim 8, further comprising accessing the first memory, via the third communication channel that is a point-to-point communication channel, based at least in part on an elapse of an amount of time since the indication was received.

10. The method as recited in claim 8, wherein accessing of the first memory, by the second processing node, targets a video frame rendered by the first processing node that is stored in the first memory.

11. The method as recited in claim 8, further comprising the second processing node sending, via the third communication channel that is a point-to-point communication channel, a given access request to a memory controller of the first memory.

12. The method as recited in claim 9, further comprising transferring data between the first processing node and the second processing node via the second communication channel different from any point-to-point communication channel.

13. The method as recited in claim 12, further comprising storing, by the second processing node, data received via the second communication channel in a second memory different from the first memory.

14. The method as recited in claim 12, wherein:
the third communication channel is a point-to-point communication channel that supports a Graphics Double Data Rate communication protocol; and
the second communication channel supports a Peripheral Component Interconnect Express communication protocol.

15. A computing system comprising:
a first processing node configured to access a first memory via a first communication channel, wherein a communication channel supports data transmission comprising at least requests and responses between a single source and a single destination; and
a second processing node configured to:
receive, via a second communication channel, an indication of a memory access by the first processing node to the first memory; and
access the first memory using a third communication channel, based at least in part on the indication.

16. The computing system as recited in claim 15, wherein the second processing node is configured to send a given access request to the first memory via the third communication channel that is a point-to-point communication channel, in response to determining a particular amount of time has elapsed after receipt of the indication.

17. The computing system as recited in claim 15, wherein the access of the first memory targets a video frame rendered by the first processing node and stored in the first memory.

18. The computing system as recited in claim 15, wherein the second processing node is configured to send, via the third communication channel that is a point-to-point communication channel, a given access request to a memory controller of the first memory.

19. The computing system as recited in claim 16, wherein the first processing node is configured to transfer data with the second processing node via the second communication channel between the first processing node and the second processing node different from any point-to-point communication channel.

20. The computing system as recited in claim 19, wherein second processing node is configured to store data received via the second communication channel in a second memory different from the first memory.

\* \* \* \* \*